United States Patent
Lindell et al.

(10) Patent No.: US 10,242,826 B2
(45) Date of Patent: Mar. 26, 2019

(54) ELECTRIC POWER DISTRIBUTION SWITCHGEAR AND METHOD OF BREAKING AN ELECTRIC POWER CURRENT

(71) Applicant: ABB Schweiz AG, Baden (CH)

(72) Inventors: Elisabeth Lindell, Västerås (SE); Lars Liljestrand, Västerås (SE); Stefan Halén, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/747,832

(22) PCT Filed: Jun. 17, 2016

(86) PCT No.: PCT/EP2016/063973
§ 371 (c)(1),
(2) Date: Jan. 26, 2018

(87) PCT Pub. No.: WO2017/016748
PCT Pub. Date: Feb. 2, 2017

(65) Prior Publication Data
US 2018/0226213 A1     Aug. 9, 2018

(30) Foreign Application Priority Data
Jul. 28, 2015  (EP) .................................. 15178554

(51) Int. Cl.
*H01H 33/664* (2006.01)
*H01H 33/59* (2006.01)
(Continued)

(52) U.S. Cl.
CPC ........ *H01H 33/664* (2013.01); *H01H 33/593* (2013.01); *H02B 1/26* (2013.01);
(Continued)

(58) Field of Classification Search
USPC ........................................................ 361/618
See application file for complete search history.

(56) References Cited

U.S. PATENT DOCUMENTS 2,246,926 A * 6/1941 Roman ................. H02H 9/007
307/105
4,209,814 A   6/1980 Garzon
(Continued)

FOREIGN PATENT DOCUMENTS

JP    H08149698 A    6/1996

OTHER PUBLICATIONS

European Search Report Application No. 15178554.0 Completed: Jan. 29, 2016; dated Feb. 15, 2016 6 Pages.
(Continued)

*Primary Examiner* — Mukundbhai G Patel
(74) *Attorney, Agent, or Firm* — Whitmyer IP Group LLC

(57) ABSTRACT

An electric power distribution switchgear is connected between an electric power grid and an electric power equipment. The switchgear includes a synchronized vacuum switching apparatus configured to break the current to the electric power equipment using a synchronized technique to avoid re-ignition during the breaking and thus any transients caused by such re-ignition; and a surge arrester arrangement connected to the electric power equipment, the surge arrester arrangement being designed and configured to only handle transients caused by the current chopping at the breaking. The surge arrester arrangement can be arranged remote from the electric power equipment, such as e.g. in the same casing as the synchronized vacuum switching apparatus.

12 Claims, 3 Drawing Sheets

(51) Int. Cl.
*H02H 3/02* (2006.01)
*H02B 1/26* (2006.01)
*H02B 1/28* (2006.01)
*H02B 13/00* (2006.01)
*H01H 9/56* (2006.01)
*H01H 33/66* (2006.01)

(52) U.S. Cl.
CPC .............. *H02B 1/28* (2013.01); *H02B 13/00* (2013.01); *H02H 3/021* (2013.01); *H01H 9/563* (2013.01); *H01H 33/66* (2013.01)

(56) References Cited

U.S. PATENT DOCUMENTS

| | | | | |
|---|---|---|---|---|
| 4,494,163 A | * | 1/1985 | Yelland | H02H 9/005 361/110 |
| 4,628,393 A | | 12/1986 | Griesen | |
| 4,922,363 A | * | 5/1990 | Long | H01H 9/56 361/146 |
| 4,950,854 A | | 8/1990 | Green | |
| 5,633,540 A | | 5/1997 | Moan | |
| 6,392,390 B1 | | 5/2002 | Ito et al. | |
| 7,576,957 B2 | * | 8/2009 | Zhou | H01H 9/563 361/2 |
| 2009/0159413 A1 | | 6/2009 | Perera | |
| 2011/0299228 A1 | * | 12/2011 | Milovac | H02B 11/26 361/614 |

OTHER PUBLICATIONS

International Search Report and Written Opinion of the International Searching Authority Application No. PCT/EP2016/063973 Completed: Jul. 6, 2016; dated Jul. 14, 2016 12 Pages.

\* cited by examiner

ELECTRIC POWER DISTRIBUTION SWITCHGEAR AND METHOD OF BREAKING AN ELECTRIC POWER CURRENT

TECHNICAL FIELD

The present invention relates to electric power distribution switchgears and to methods of breaking electric power currents.

BACKGROUND

Electrical power distribution networks are protected and controlled by switching apparatuses.

A circuit breaker can be an automatically operated electrical switch designed to protect an electrical circuit from damage caused by overload or short circuit. Its basic function is to detect a fault condition and interrupt current flow. Unlike a fuse, which operates once and then must be replaced, a circuit breaker can be reset (either manually or automatically) to resume normal operation.

Circuit breakers are also increasingly used to switch loads on and off.

Circuit breakers are made in varying sizes, from small devices that protect an individual household appliance up to large switchgear designed to protect high voltage circuits feeding an entire city.

The circuit breaker contacts must carry the load current without excessive heating, and must also withstand the heat of the arc produced when interrupting (opening) the circuit. Contacts may be made of copper or copper alloys, such as e.g. copper-tungsten alloys, silver alloys and other highly conductive materials. Service life of the contacts is limited by the erosion of contact material due to arcing while interrupting the current. Miniature and moulded-case circuit breakers are usually discarded when the contacts have worn, but power circuit breakers and high-voltage circuit breakers have replaceable contacts.

When a current is interrupted, an arc is generated. This arc must be contained, cooled and extinguished in a controlled way, so that the gap between the contacts can again withstand the voltage in the circuit. Different circuit breakers use vacuum, air, insulating gas or oil as the medium the arc forms in.

Other types of electrical switches are load break switches and contactors. They are also used for switching loads on and off.

SUMMARY

Vacuum circuit breakers are capable of interrupting high frequency currents and therefore there is a certain possibility that multiple re-ignitions may appear at the interruption, especially where there are purely or partly inductive loads.

When breaking a power distribution current by a vacuum circuit breaker between two energized parts of the power system, it is beneficial to synchronize the operation with the phase angle of the current through the circuit breaker. If this matching or "synchronizing" process is not done correctly, a power system disturbance may result and power equipment can be damaged. In order to synchronize properly, different aspects of the circuit breaker must be known or closely monitored:

The voltage and/or current magnitudes
The frequency of the voltages and/or the currents
The phase angles of the voltages and/or the currents Synchronization of vacuum circuit breakers have been studied extensively and there exist a number of synchronization techniques, but still they are generally limited to certain operation cases. Synchronization of vacuum circuit breakers can be designed to avoid transients caused by re-ignitions and virtual current chopping during circuit breaker opening. These transients are the worst transients due to their amplitudes, steepness, and, not at least, frequency.

The present invention is based on the realization that while the synchronization techniques have generally good performance, it is still also difficult to take care of all aspects of a breaking process since different phenomena may occur, which may have to be taken care of in different manners. Thus, different synchronization techniques have different performances in different environments, where different phenomena take place during the breaking process.

An object of the present invention is to provide an electric power distribution switchgear, which comprises a synchronized vacuum circuit breaker, but which still is capable of alleviating, or at least mitigating, problems with transient over voltages while performing a breaking process.

These objects are attained by electric power distribution switchgears and methods of breaking power distribution currents as claimed in the appended patent claims.

According to a first aspect, an electric power distribution switchgear is connected between an electric power grid and an electric power equipment, constituting pure, or partwise, inductive load. In one embodiment, the electric power equipment is a transformer of a three-phase power system.

The electric power distribution switchgear comprises (i) a synchronized vacuum switching apparatus like for instance a vacuum circuit breaker or vacuum contactor or vacuum load break switch configured to break the current to said electric power equipment using a technique synchronized with the current through the apparatus so as to avoid re-ignition during the breaking and thus any transient over-voltages caused by such re-ignition; and (ii) a surge arrester arrangement connected to said electric power equipment, the surge arrester arrangement being designed and configured to only handle transients caused by current chopping of the load current at the breaking.

The synchronization of the vacuum circuit breaker causes the vacuum circuit breaker to break each phase current at a phase angle, at which the phase current is different from zero. In one version, the synchronized vacuum circuit breaker starts opening of its contacts of each phase approximately at a phase angle, at which the phase voltage has a zero crossing, or thereafter. For a pure inductive load, this means that the contacts start opening at about one fourth of a period, or less, from a current zero crossing. For a 50 Hz three-phase system, the contacts may be separated at about 1, 2, 3, 4, or 5 ms before a zero current crossing.

The contact separation of the switching apparatus should be started at a phase angle of the current to ensure an arcing time before the current is interrupted, which arcing time is long enough to make the contact separation large enough to withstand the recovery voltage after the current is interrupted and this way preventing re-ignitions and re-strikes. Too short arcing time may result in re-ignition while too long arcing time may result in wear and tear of the contacts of the switching apparatus. A suitable arcing time may be from about 0.5 ms to a time corresponding to about one fourth of a period of the current through the switching apparatus. Typically, transient over-voltages caused by said re-ignition may have a first frequency content and the transients caused by current chopping of the load current at the breaking may have a second frequency content, which is lower or much lower range than the first frequency contents. Thus, transients caused by re-ignition are complex to handle by traditional protecting devices such as surge arrester arrangements, as they need to be placed very close to the equipment they are intended to protect, whereas surge arrester arrangements can easily be designed and configured to handle the lower frequency (e.g. kHz region) slowly varying over-voltages caused by the current chopping of the current at the breaking. A further benefit is that the lower frequency over-voltages allows a location of the surge arrester arrangement, which is remote from the equipment it is intended to protect. By remote is here meant a selected distance away from the equipment and not in absolute proximity thereto.

By current chopping is here understood an interruption of an alternating current when the arc is extinguished, which is before, or slightly before, its neutral zero.

By the above provisions, the surge arrester arrangement does not need to be located in direct connection with the electric power equipment, which it protects, but can be located remote from there as mentioned above. This is due to the lower frequencies of the transient over voltages caused by the current chopping (typically in the kHz range).

In one embodiment, the electric power distribution switchgear comprises an enclosure having compartments housing both the switching apparatus and the surge arrester arrangement, where the surge arrester arrangement is connected to the electric power equipment side of the power distribution switchgear in order to handle the slowly varying over-voltages caused by the current chopping at the breaking of the current.

Hereby, both the switching apparatus and the surge arrester arrangement can be placed in a common cabinet. While the electrodes of the synchronized vacuum switching apparatus may be arranged in a vacuum chamber, parts of, or the entire, synchronized vacuum switching apparatus, and optionally also the surge arrester arrangement, can be arranged in a sealed gas tight encapsulation, which may comprise a dielectric insulation medium. The dielectric insulation medium may comprise an insulating gas, and preferably a gas that has a GWP of less than 2300, and preferably less than 150. A suitable dielectric insulation gas may be an organofluorine compound selected from the group consisting of: a fluorether, an oxirane, a fluoramine, a fluoroketone, a fluoroolefin, and mixtures and/or decomposition products thereof.

In one embodiment, the synchronized vacuum switching apparatus is a multi-pole apparatus, wherein all phases are interrupted simultaneously. However, a multipole apparatus of the above kind may be usable to interrupt the current in one phase initially and to interrupt all other phases at a time which is less than half a period later (with respect to the alternating current used). For example, for a 50 Hz system, the second interruption may be initiated less than 10 ms, such as e.g. at about 5 ms, later than the first interruption, given a 50 Hz system.

According to a second aspect a method of breaking an electric power current in an electric power distribution switchgear is provided. According to the method, the current to an electric power equipment is broken by a synchronized vacuum switching apparatus using a technique synchronized with the current through the switching apparatus (to the electric power equipment) so as to avoid re-ignition during the breaking and thus any transient over-voltages caused by such re-ignition. Further, transients caused by current chopping of the current at the breaking is handled by a surge arrester arrangement connected to the electric power equipment, the surge arrester arrangement being designed and configured to only handle the over-voltages caused by the current chopping, which are slowly varying (e.g. in the kHz range) as compared to the other transients, which have higher frequency and which are avoided by the synchronized breaking.

The transients handled by the surge arrester arrangement are more easily handled by the surge arrester arrangement (as compared to the other transients) due to their more slowly varying voltage levels, and as a result, the surge arrester arrangement does not have to be arranged in direct connection with the electric power equipment to be protected, but can be arranged at a selected distance from it such as within a cabinet of the electric power distribution switchgear, which then houses both the synchronized vacuum switching apparatus and the surge arrester arrangement. The lower the frequency of the transient over-voltage resulting from the current chopping is, the more far from the equipment to protect, the surge arrester arrangement can be installed while still taking care of its duties.

It shall be appreciated that the details and embodiments disclosed above with respect to first aspect are equally applicable, mutatis mutandis, to the method of the second aspect.

The electric power distribution switchgear disclosed above may be a medium voltage device having a rated voltage of 72 kV or less, and consequently, the electric power equipment and the electric power grid, to which the electric power equipment is connected, have also voltage ratings in the medium voltage range.

Further characteristics of the invention and advantages thereof, will be evident from the following detailed description of preferred embodiments of the present invention given hereinafter and the accompanying FIGS. 1-3, which are given by way of illustration only and are thus not limitative of the present invention.

DETAILED DESCRIPTION

Figure 1:
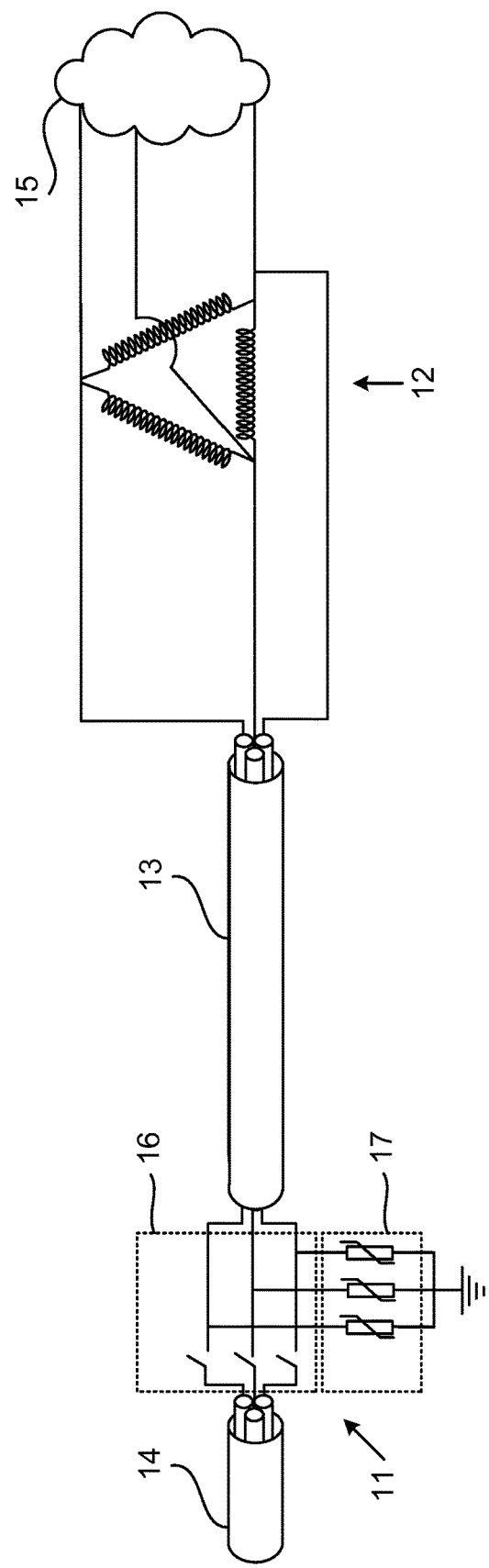
FIG. 1 illustrates, schematically, in a circuit diagram, an electric power distribution system comprising an electric power distribution switchgear according to an embodiment.

FIG. 1 illustrates, schematically, in a circuit diagram, a three-phase electric power distribution system comprising an electric power distribution switchgear 11 according to an embodiment.

The electric power distribution system comprises an electric power equipment 12 connected via power line 13, the electric power distribution switchgear 11 and power line 14 to an electric power grid. The electric power equipment 12 may constitute an inductive load 15, and may, for example, comprise a transformer.

The electric power distribution switchgear 11 comprises a synchronized vacuum circuit breaker 16 for breaking the current between the power lines 13, 14, and a surge arrester arrangement 17 for protecting the electric power equipment 12 from some kind of transients in case of a breaking process is effectuated.

Synchronization of the vacuum circuit breaker 16 with the inductive current through it during a breaking process is used to avoid a first class of transients, namely transients which may occur from re-ignition and virtual current chopping during the breaking. These transients are complex and costly to handle with surge arrester devices, but can be partly or entirely avoided by a proper synchronization of the vacuum circuit breaker 16 during the breaking process.

The synchronization of the vacuum circuit breaker 16 may cause the vacuum circuit breaker contacts to open at a phase angle of the current which allows an arcing time of about 1, 2, 3, 4, or 5 ms for a 50 Hz system before the current is interrupted by the current chopping.

In one version, the synchronized vacuum circuit breaker contacts open approximately at a phase angle, at which the phase voltage has a zero crossing, or thereafter. For a pure inductive load, this means that the contacts start to open at about one fourth of a period from a current zero crossing (i.e. at maximum current), or thereafter (but still before the zero current crossing) such as at about 1, 2, 3, 4, or 5 ms before the zero current crossing in a 50 Hz system. Such breaking of the phase current will minimize the risk of re-ignition, that is, during an initial part of the separation of the circuit breaker electrodes, the absolute value of the current amplitude is decreasing towards zero. When the current amplitude reaches the chopping level, the distance between the circuit breaker electrodes will be large enough to minimize the risk of re-ignition.

The synchronization does not handle transients caused by current chopping of the load current at the breaking (that is, the instantaneous cutting of the current before the natural zero crossing), but the over voltage transients caused by this have lower to much lower frequency content than the transients which are handled—and avoided—using the synchronization. The over-voltage transients have a rather low frequency, such as e.g. in the kHz range, and can easily and readily be handled by a surge arrester arrangement, which also does not have to be located in direct connection with the electric power equipment 12 it protects, but can be arranged remote from there, e.g. even at the other end of the power line 13.

Hereby, an electric power distribution switchgear 11 is obtained, which uses a synchronized vacuum circuit breaker 16 for breaking the current while avoiding any transient over-voltages caused by re-ignition (and optionally by virtual current chopping) during the breaking combined with a surge arrester arrangement 17 for handling more slowly varying transient over-voltages caused by the current chopping of the load current at the breaking. The latter can easily be achieved by a surge arrester arrangement 17, which can even be located remote from the electric power equipment 12. The surge arrester arrangement 17 can advantageously be located together with the synchronized vacuum circuit breaker 16 in a common housing.

Figure 2:
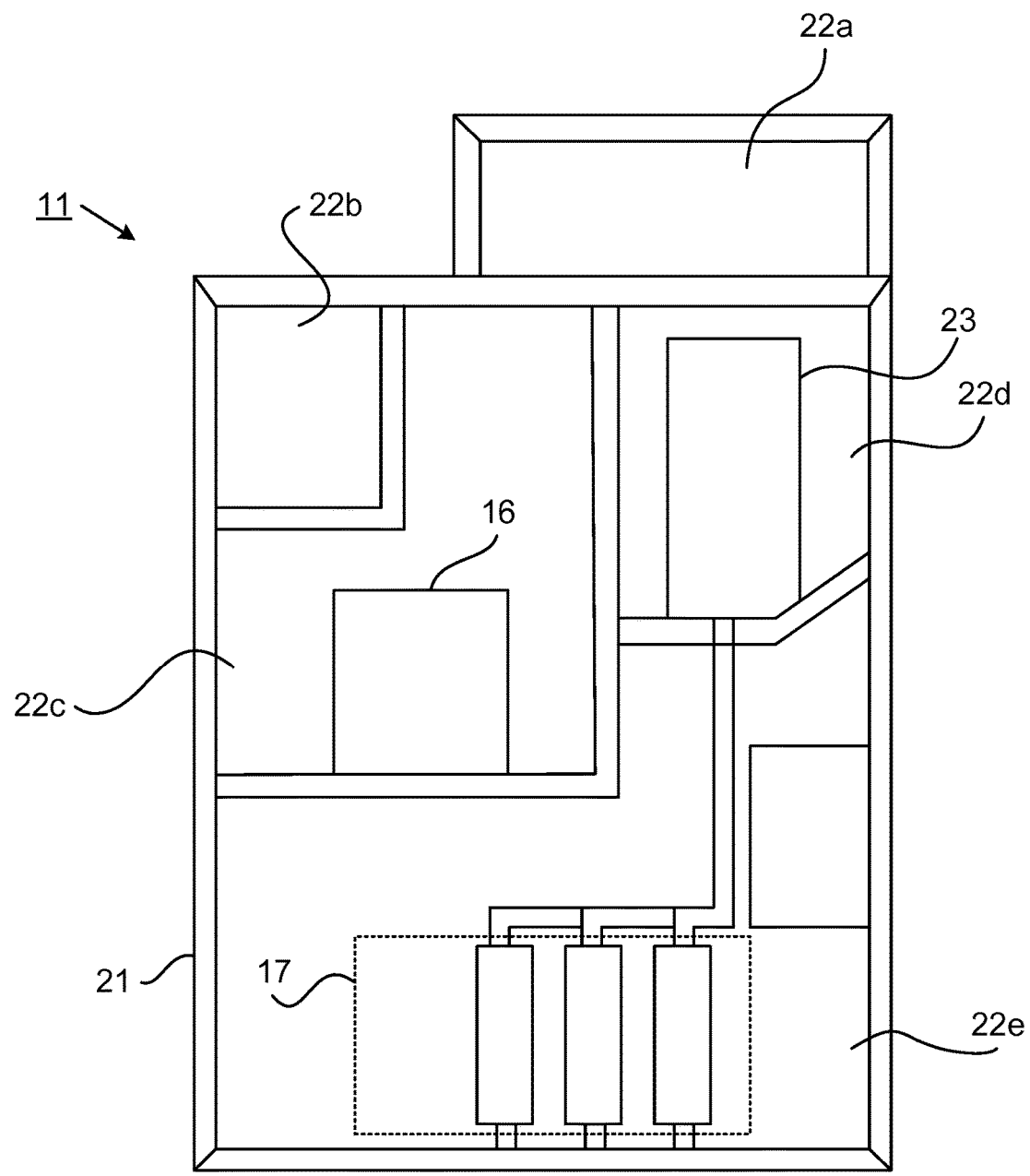
FIG. 2 illustrates, schematically, in an end view, the electric power distribution switchgear of FIG. 1.

FIG. 2 illustrates, schematically, in an end view, such an embodiment of the electric power distribution switchgear of FIG. 1.

The electric power distribution switchgear 11 comprises an encapsulation, casing, or housing 21 with different compartments 22a-e. Compartment 22a is a compact gas duct channel, compartment 22b is a low voltage compartment, compartment 22c is a circuit-breaker compartment, compartment 22d is a busbar compartment, and compartment 22e is a surge arrester compartment. The synchronized vacuum circuit breaker 16 may be arranged in compartment 22c, the surge arrester arrangement 17 may be arranged in compartment 22e, and a busbar device 23 may be arranged in compartment 22d. Note that while the surge arrester arrangement 17 may be located remote from the electric power equipment 12 (see FIG. 1), it has still to be connected to the power line 13, e.g. via the busbar device 23 in compartment 22d.

The housing 21, or at least the part of it, which houses parts of, or the entire, synchronized vacuum circuit breaker 16, may comprise a sealed gas tight encapsulation. A dielectric insulation medium, such as air or a dielectric insulation gas comprising an organofluorine compound selected from the group consisting of: a fluorether, an oxirane, a fluoramine, a fluoroketone, a fluoroolefin, and mixtures and/or decomposition products thereof, may be present in the sealed gas tight encapsulation.

Figure 3:
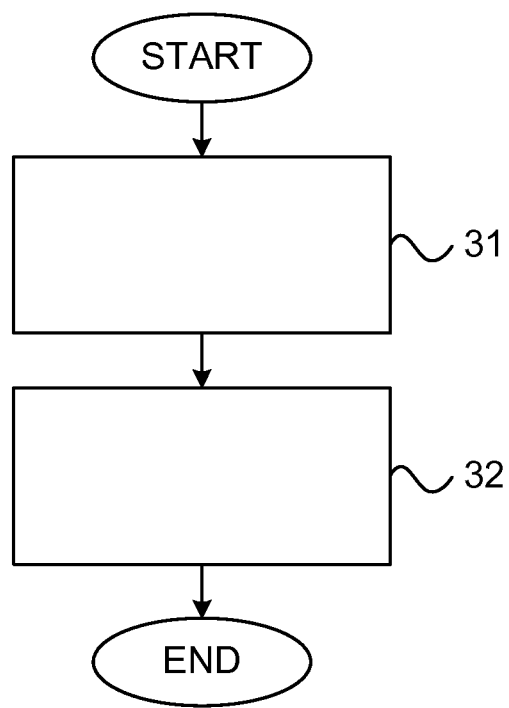
FIG. 3 illustrates, schematically, in a flow scheme, an embodiment of a method of breaking an electric power current.

FIG. 3 illustrates, schematically, in a flow scheme, an embodiment of a method of breaking an electric power current in an electric power distribution switchgear such as e.g. the one in any of FIGS. 1-2.

The current to the electric power equipment is, in a step 31, broken by a synchronized vacuum switching apparatus using a technique synchronized with the current through the synchronized vacuum switching apparatus so as to avoid re-ignition during the breaking and thus any transient over-voltages caused by such re-ignition.

The remaining transients, which are those low frequency transients caused by current chopping of the load current at the breaking, are, in a step 32, handled by a surge arrester arrangement connected to the electric power equipment, wherein the surge arrester arrangement is designed and configured to only handle such transients caused by the current chopping of the load current at the breaking.

The slowly varying transient over-voltages caused by the current chopping at the breaking (which may be in the kHz region) may be handled by a surge arrester arrangement, which can even be arranged remote from the electric power equipment, such as e.g. together with the synchronized vacuum switching apparatus in a common enclosure of the electric power distribution switchgear.

It shall be appreciated that each of the various embodiments end details disclosed with reference to the embodiments of FIGS. 1-3 may, possibly after minor modifications, be applicable to any other of the illustrated embodiments.

It shall further be appreciated that the embodiments disclosed above are only illustrative examples, and should thus not be construed as, or limit, any scope of protection of the present invention.

The invention claimed is:

1. An electric power distribution switchgear connected between an electric power grid and an electric power equipment, wherein said electric power equipment is an inductive load, the electric power distribution switchgear comprising:
  a synchronized vacuum switching apparatus of a voltage rating adapted to the voltage rating of the electric power distribution switchgear, the synchronized vacuum switching apparatus having contacts that provide electrical connection when closed, the switching apparatus being configured to break a current to said electric power equipment by opening the contacts in synch with the current through the synchronized vacuum switching apparatus to prevent re-ignition during the breaking and thus any transient over-voltages caused by such re-ignition, the transient over-voltages caused by such re-ignition have a first frequency;
  a surge arrester arrangement connected to said electric power equipment and protecting said electric power equipment against transients caused by current chopping of the current at the breaking, the transients caused by current chopping of the current at the breaking have a second frequency; and an enclosure having compartments housing said synchronized vacuum switching apparatus and said surge arrester arrangement;

wherein the second frequency is lower or much lower than the first frequency.

2. The electric power distribution switchgear of claim 1 wherein said surge arrester arrangement is arranged remote from said electric power equipment.

3. The electric power distribution switchgear of claim 1 wherein said electric power equipment includes a transformer.

4. The electric power distribution switchgear of claim 1 wherein said electric power distribution switchgear is a three-phase device and the surge arrester arrangement includes at least one surge arrester for each phase.

5. The electric power distribution switchgear of claim 1 wherein said electric power distribution switchgear includes a sealed gas tight encapsulation, in which said synchronized vacuum switching apparatus is arranged.

6. The electric power distribution switchgear of claim 5, wherein a dielectric insulation medium is present in the encapsulation.

7. The electric power distribution switchgear of claim 6, wherein the dielectric insulation medium is a dielectric insulation gas including an organofluorine compound selected from the group consisting of: a fluorether, an oxirane, a fluoramine, a fluoroketone, a fluoroolefin, and mixtures and/or decomposition products thereof.

8. The electric power distribution switchgear of claim 1 wherein the vacuum switching apparatus is a vacuum circuit breaker, a vacuum contactor, or a vacuum load break switch.

9. A method of breaking an electric power current in an electric power distribution switchgear connected between an electric power grid and an electric power equipment, the electric power distribution switchgear having a synchronized vacuum switching apparatus, a surge arrester arrangement, and an enclosure having compartments housing said synchronized vacuum switching apparatus and said surge arrester arrangement, wherein said electric power equipment has inductive load and the method comprises the step of:

opening contacts of the synchronized vacuum switching apparatus in synch with the current through the synchronized vacuum switching apparatus to prevent re-ignition during the breaking and thus any transient over-voltages caused by such re-ignition, the transient over-voltages caused by such re-ignition have a first frequency; and using the surge arrester arrangement which is connected to said electric power equipment to protect said electric power equipment against transients caused by current chopping of the current at the breaking, the transients caused by current chopping of the current at the breaking have a second frequency;

wherein the second frequency is lower or much lower than the first frequency.

10. The method of claim 9 wherein said surge arrester arrangement is arranged remote from said electric power equipment having inductive load.

11. The method of claim 9 wherein said method is performed in a three-phase system and said surge arrester arrangement includes at least one surge arrester for each phase.

12. The method of claim 10 wherein said method is performed in a three-phase system and said surge arrester arrangement includes at least one surge arrester for each phase.

* * * * *